United States Patent
Parris et al.

(10) Patent No.: US 11,784,333 B2
(45) Date of Patent: Oct. 10, 2023

(54) ENERGY MANAGEMENT SYSTEMS FOR FUEL CELLS

(71) Applicant: SOLIDPOWER (AUSTRALIA) PTY LTD, Dandenong South (AU)

(72) Inventors: Brian Parris, Dandenong South (AU); Michael Kah, Dandenong South (AU)

(73) Assignee: SOLIDPOWER (AUSTRALIA) PTY LTD, Dandenong South (AU)

( * ) Notice: Subject to any disclaimer, the term of this patent is extended or adjusted under 35 U.S.C. 154(b) by 0 days.

(21) Appl. No.: 17/598,658

(22) PCT Filed: Apr. 3, 2020

(86) PCT No.: PCT/AU2020/050330
§ 371 (c)(1),
(2) Date: Sep. 27, 2021

(87) PCT Pub. No.: WO2020/198800
PCT Pub. Date: Oct. 8, 2020

(65) Prior Publication Data
US 2022/0181657 A1    Jun. 9, 2022

(30) Foreign Application Priority Data
Apr. 3, 2019  (AU) .............................. 2019901138

(51) Int. Cl.
*G06F 1/3206*  (2019.01)
*H01M 8/04537*  (2016.01)
*G06F 1/20*  (2006.01)

(52) U.S. Cl.
CPC ........ *H01M 8/04619* (2013.01); *G06F 1/206* (2013.01); *G06F 1/3206* (2013.01)

(58) Field of Classification Search
CPC ... H01M 8/04619; G06F 1/206; G06F 1/3206
See application file for complete search history.

(56) References Cited

U.S. PATENT DOCUMENTS 6,680,547 B1 * 1/2004 Dailey ...................... H02J 3/28
                                                        307/29
9,563,483 B2    2/2017 McKnight et al.
(Continued)

FOREIGN PATENT DOCUMENTS

EP    2098942 A1    9/2009
EP    3921719 A1    12/2021

OTHER PUBLICATIONS

International Search Report and Written Opinion for PCT/AU2020/050330 dated Jun. 16, 2020, 10 pages.
(Continued)

*Primary Examiner* — Gary Collins
(74) *Attorney, Agent, or Firm* — Duane Morris LLP (57) ABSTRACT

The present disclosure provides a method of managing the power requirements of a facility powered by fuel cells, the facility including: a primary system having a non-discretional load requirement; and one or more ancillary load consuming systems having a nominal load; at least one fuel cell to provide power to the primary system to meet the non-discretional load requirement and provide power to the one or more ancillary systems; and a control system configured to monitor the non-discretional load requirement and to control the supply of power to the primary system and to the one or more ancillary load consuming systems. The method includes: detecting a change in the non-discretional load requirement; adjusting the power supplied to the one or more ancillary load consuming systems from the nominal load to meet the change in the non-discretional load requirement; and providing power to the primary system to meet the changed non-discretional load requirement.

24 Claims, 2 Drawing Sheets

(56) References Cited

U.S. PATENT DOCUMENTS

| | | | |
|---|---|---|---|
| 2006/0047808 A1 | 3/2006 | Sharma et al. | |
| 2006/0072262 A1* | 4/2006 | Paik | H02J 3/14 361/62 |
| 2011/0187197 A1* | 8/2011 | Moth | H02J 9/062 307/66 |
| 2013/0253716 A1* | 9/2013 | Gross | G06F 1/26 700/287 |
| 2014/0106247 A1* | 4/2014 | Higdon | H01M 8/04373 429/417 |
| 2018/0052431 A1 | 2/2018 | Shaikh et al. | |
| 2018/0375133 A1 | 12/2018 | Berntsen et al. | |
| 2020/0207326 A1* | 7/2020 | Wenger | B60H 1/00771 |

OTHER PUBLICATIONS

Extended European Search Report for corresponding European Patent Application No. 20784215.4 dated Feb. 10, 2023, 7 pages.

\* cited by examiner

Figure 1

Figure 2

ENERGY MANAGEMENT SYSTEMS FOR FUEL CELLS

CROSS REFERENCE TO RELATED APPLICATIONS

This application is a National Stage Application, filed under 35 U.S.C. 371, of International Patent Application No. PCT/AU2020/050330, filed on 3 Apr. 2020, which claims the benefit of Australian Patent Application No. 2019901138 filed 3 Apr. 2019, the entireties of which are incorporated herein by reference.

FIELD OF THE INVENTION

The present invention relates to a fuel cell energy management system, and corresponding methods for managing a facility powered by such fuel cells.

BACKGROUND OF THE INVENTION

Fuel cells are electrochemical cells that produce electricity from a source of fuel and an oxidant via an electrochemical reaction. Fuel cells find use as a power supply in a range of applications, and are commonly used to provide primary and backup power to commercial, industrial, and residential buildings, particularly in remote or inaccessible areas. Fuel cells are particularly useful in these environments as they are relatively compact, lightweight, modular, and efficient. Additionally, fuel cells have no moving parts and are therefore robust and reliable. For remote installations where power to meet a load is provided by a single power supply (i.e. a fuel cell which may be in the form of a stack of fuel cells), load control is a particularly important factor as the power supply will collapse if too much power is drawn from the power supply.

There are a number of different types of fuel cells. However, broadly, a fuel cell includes an anode and cathode separated by an electrolyte. During operation, a fuel source (generally a hydrocarbon such as natural gas, or hydrogen) is provided to the anode and an oxidant (typically air, while oxygen is actually utilised in the fuel cell) is provided to the cathode. At the anode, the fuel source is broken down into electrons and cations for a proton-exchange membrane fuel cell (PEMFC). These cations then migrate through the electrolyte toward the cathode. The electrons are precluded from migrating through the electrolyte, and instead flow through a wire connection between the anode and the cathode and power an electrical load there between, prior to reacting with the cations and the oxidant at the cathode (which typically forms water). Alternatively, fuel cells such as a solid oxide fuel cell (SOFC) involve the formation of anions at the cathode, and the transmission of these anions to the anode via the electrolyte where electrons are then liberated via oxidation of the anion while reacting with the fuel to form water. Fuel cells may be arranged in a fuel cell stack to provide higher voltages and/or current depending on the intended application and the nature of the electrical load.

Fuel cells are not well adapted to handle sudden changes in load and/or fast cycling of load. Fuel cells are only capable of fast cycling if the energy is available and hence are limited by the maximum fuel utilisation. Difficulty in meeting transient load requirements is a problem for a critical system requiring a non-discretional electrical load. The lag in increased power generation from the fuel cell may result in that critical system failing or shutting down. Conversely, if there is a transient, sudden, or unanticipated decrease in the non-discretional electrical load, a voltage surge may occur which can damage components and systems powered by the fuel cell. In addition, while a fuel cell system may detect that power consumption has decreased, or that power is not being consumed, and may thus consequently reduce the power being generated, if this is done too quickly it could lead to a system shut down.

Due to the nature of the electrochemical reaction, fuel cells are more efficiently operated at steady state with a set temperature and a set fuel utilisation. For example, in one such system the typical fuel utilisation may be limited to 85% capacity. Fuel utilisation describes the amount of fuel converted in a fuel cell into electricity divided by the total amount of fuel entering the fuel cell. However, small deviations from this are possible, such as within a narrow operating band of ±5%. Increasing or decreasing an electrical load that would draw power outside of this range can have detrimental effects on the fuel cell. Increasing the electrical load at constant fuel input is particularly problematic as this can 'damage' the fuel cell through degradation of the fuel cell components (in particular the anode). Breakdown of the fuel cell components in this manner can negatively impact the structure of the fuel cell, reduce the performance of the fuel cell, and/or reduce the life of the fuel cell. Decreasing the electrical load does not generally cause degradation of the fuel cell, but can lead to a system shut down as excess power is dumped into the fuel cell system which can lead to the fuel cell system over-heating. Thus, fuel cells are particularly well suited to power electrical loads that are steady or vary within a narrow and/or predictable range and/or such changes in electrical load have a time constants in the order of minutes (as the time limiting factor for increasing power generation from the fuel cell is generally the rate at which fuel and steam supplied to the fuel cell can be increased).

If a fuel cell is operated near its maximum utilisation and a sudden increase in electrical load occurs, the fuel cell may not have sufficient capacity at the current fuel supply rate to meet the increased load. If the fuel cell cannot meet the increased load then there is a corresponding drop in the voltage supplied by the fuel cell. This voltage drop can have an adverse effect on a device or system powered by the fuel cell, and may result in failure or shutdown of that device or system.

The electrical output from a fuel cell or fuel cell stack may be modulated by altering the flow of fuel to the fuel cell or fuel cell stack. The provision of fuel and oxidant is generally limited by the flow control of the fuel/steam and oxidant streams. Typically it takes several minutes for a fuel cell system to adjust from 25% to 100% load (and vice versa). Thus, the response time for modulating fuel/steam flow is not sufficiently rapid to meet transient changes in load, especially as the fuel to steam ratio needs to be controlled tightly as well. That is, there is a time lag between the increased load requirements, and the ability of the fuel cell to provide that increased power by increasing the fuel supply rate. Furthermore, if a fuel cell is run at 80% or 85% fuel utilisation, the margin to increase power from the fuel cell is very limited. Hence a sudden increase in power requirement that is not matched by a corresponding fuel increase will lead to a voltage drop that may be detrimental to the fuel cell especially if fuel utilisation approaches 100% or power requirements exceed 100% fuel utilisation resulting in irreversible damage to the fuel cell.

Another effect related to the delay in adjusting the fuel supply flow rate to address a transient change in load is that a decrease in the efficiency of power production from the fuel cell occurs. The efficiency of a fuel cell is dependent, in part, on the inlet temperature, the outlet temperature, and the supply rate of fuel to the fuel cell. Changes in the amount of fuel supplied to the fuel cell may decrease the efficiency of the fuel cell if the inlet or outlet temperatures of the fuel cell are not correspondingly adjusted. However, again, adjusting the temperature of a fuel cell takes time. It can take the fuel cell several hours to reach thermal equilibrium after adjusting the power set point. Thus, altering the flow rate of the fuel in response to a transient, sudden, or unexpected change in load can result in the fuel cell operating outside it's optimum operating temperature and thus at reduced efficiency.

There are a number of options to address the issue of fast cycling in fuel cells. Energy can be taken directly from another source, for instance the electrical grid when available. Alternatively, electrical energy storage media (e.g. batteries, capacitors, and supercapacitors) have been employed to store excess energy and/or provide additional energy as required to accommodate transient, sudden, or unexpected changes in non-discretionary electrical load. That is, during periods where an increase in non-discretionary electrical load occurs, the additional non-discretionary load can be met by electrical energy taken or stored in a power grid, or taken or stored in the storage media such that the power grid or storage media effectively smooths the power by providing energy storage from which the load can draw during times of transient high current. This makes the operation of the fuel cell easier because the fuel cell does not have to deal with high changes in current. In effect, the power grid or energy storage media acts to average the current demand of the non-discretionary load as seen by the fuel cell. Conversely, during periods where a decrease in the non-discretionary electrical load occurs, the excess power produced by the fuel cell can be stored in the power grid; or in batteries, capacitors, or supercapacitors to be subsequently drawn during periods of increased non-discretionary load.

While energy storage media provides a mechanism for addressing the problem of transient increases or decreases in the non-discretionary electrical load, it has a number of shortcomings. In particular, batteries, capacitors, and supercapacitors occupy a significant volume and require a range of support services and are therefore not suitable for facilities that have little available space. Furthermore, these options require significant capital to install and have an ongoing operating cost.

U.S. Pat. No. 9,563,483 to McKnight et al. adopts a different approach and proposes mechanisms to reduce the load on the fuel cell. McKnight et al. discloses a controller that can monitor both a fuel cell providing electrical power to one or more computing devices and the computing devices receiving the power, and can instruct the computing devices to deactivate or throttle down certain power consuming functions during instances where the power consumption demand of the computing devices is increasing more quickly than the power being sourced by the fuel cell, and can instruct the computing devices to activate or throttle up certain power consuming functions during instances where the power consumption demand of the computing devices is decreasing more quickly than the power being sourced by the fuel cell.

McKnight et al. also describes that the controller can compensate for the delayed increase in the power production of the fuel cell by temporarily offloading at least some of the processing being performed by the server computing devices of the rack to one or more server computing devices of other racks of server computing devices, either by temporarily throttling down the processing of one or more of the server computing devices of the rack, or by temporarily deactivating other power consuming components or mechanisms of the server computing devices of the rack, such as by temporarily deactivating the fans of such server computing devices, or can perform other like temporary actions or combinations thereof. McKnight et al. goes on to discuss that an alternative can be to halt the processing of low-priority, non-time critical applications or tasks running on the server computing devices, as such an action can have the effect of reducing a total processing load of the server computing devices, thereby lowering a total power consumed by the server computing devices.

McKnight et al. also discloses that the controller can compensate for the delayed decrease in the power production of the fuel cell by temporarily increasing the power consumption of one or more of the server computing devices of the rack. For example, the rack fuel cell controller can activate or increase the cooling apparatus of one or more of the server computing devices of the rack, such as by activating or increasing the speed of the fans of such server computing devices. Such an action can consume additional power, and can, thereby, prevent the voltage from surging. As another example, the rack fuel cell controller can obtain processing workload, such as from other server computing devices, for the server computing devices of the rack, thereby, again, consuming additional power. As yet another example, the rack fuel cell controller can simply instruct one or more of the server computing devices of the rack to execute loops, or perform other like busywork, just so as to increase the power consumed by such server computing devices, thereby, again, preventing the voltage of the electrical power being generated by the fuel cell from surging.

In view of the above, McKnight et al. discloses a process that treats the entire load on the fuel cell as a non-discretionary load. This load is altered by increasing or decreasing the electrical demand from the server rack (whether by decreasing internal cooling or throttling the processing requirements) or by diverting the electrical demand of one server rack to another server rack. The downside of the approach described in McKnight et al. is that a reduction in internal cooling or in computing power reduces the overall efficiency of the server rack and more importantly impacts on the server operation such as through increased temperatures (which has a negative impact on the overall lifetime of the rack if temperatures are increased too much) or reduced server capacity (resulting in slower or a more limited service to customers).

In view of the above shortcomings, an object of the present invention is to provide a method and/or fuel cell system that addresses or ameliorates at least one shortcoming of prior art methods and/or systems.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect of the invention, there is provided a method of managing the power requirements of a facility powered by fuel cells, the facility including: a primary system having a non-discretionary load requirement; and one or more ancillary load consuming systems having a nominal load; at least one fuel cell to provide power to the primary system to meet the non-discretional load requirement and to provide power to the one or more ancillary systems; and a control system configured to monitor the non-discretional load requirement, and to control the supply of power to the primary system and to the one or more ancillary load consuming systems; the method including: detecting a change in the non-discretional load requirement; adjusting the power supplied to the one or more ancillary load consuming systems from the nominal load to meet the change in the non-discretional load requirement; and providing power to the primary system to meet the changed non-discretional load requirement.

In a second aspect of the invention, there is provided a method of managing the power requirements of a data centre facility powered by fuel cells, the data centre facility including: at least one server rack including one or more servers and having a non-discretional load requirement; one or more ancillary load consuming systems having a nominal load; at least one fuel cell to provide power to the at least one server rack to meet the non-discretional load requirement and provide power to the one or more ancillary systems; and a control system configured to monitor the non-discretional load requirement and to control the supply of power to the at least one server rack and to the one or more ancillary load consuming systems; the method including: detecting a change in the non-discretional load requirement; adjusting the power supplied to the one or more ancillary load consuming systems from the nominal load to meet the change in the non-discretional load requirement; and providing power to the at least one server rack to meet the changed non-discretional load requirement.

In an embodiment of the second aspect, the non-discretional load of the at least one server rack includes at least the load required by the computational power of the servers and internal cooling of the servers and/or server rack.

In an embodiment of the first or second aspects, the at least one fuel cell is a solid oxide fuel cell.

The skilled person will appreciate that the at least one fuel cell may provide AC power or DC power. Similarly, the electrical systems described herein may be AC or DC systems.

In an embodiment of the first or second aspects, the change in the non-discretional load requirement may be an increase in the non-discretional load or a decrease in the non-discretional load.

In an embodiment of the first or second aspects, the method further includes subsequently altering the power output of the at least one fuel cell to provide power to the one or more ancillary load consuming systems at the nominal load.

In an embodiment of the first or second aspects, the method further includes subsequently altering the power output of the at least one fuel cell to provide power to meet the non-discretional load and the nominal load.

In an embodiment of the first or second aspects, the facility includes a plurality of ancillary load consuming systems, each ancillary load consuming system having a corresponding nominal load set point and corresponding operating load range that includes the nominal load set point; wherein the step of adjusting the power supplied to the one or more of the plurality of ancillary load consuming systems includes: selecting one or more ancillary load consuming systems; adjusting the power supplied to each of the selected ancillary load consuming systems from the corresponding nominal load set point to another load value within the corresponding operating load range; and diverting power from, or providing power to the one or more ancillary load consuming systems to meet the load value.

In one form of the above embodiment, the control system is configured to assign a rank to each ancillary load consuming system in the plurality of load consuming systems, and the step of selecting one or more ancillary load consuming systems includes selecting the one or more ancillary load consuming systems based on the assigned rank.

In an embodiment of the first or second aspects, the ancillary load consuming systems are one or more systems selected from the group consisting of: lighting, ventilation, air conditioning, heating and/or cooling, electric hot water storage, refrigeration, or battery operated devices which are connected as an ancillary load consuming system. An example of a battery operated device includes laptops which are often connected as an ancillary load, but can continue to run on batteries if, for example, power is cut.

In an embodiment the first or second aspect, each ancillary load consuming system in the plurality of ancillary load consuming systems may comprise one or more subsystems, subcomponents, or subunits. In this embodiment, the step of adjusting the power supplied to the one or more ancillary load consuming systems may comprise adjusting the power supplied to one or more subsystems, subcomponents, or subunits of a particular ancillary load consuming system in the plurality of ancillary load consuming systems. For example, in an embodiment where the ancillary load consuming system is an air conditioning system, the air conditioning system may comprise a plurality of air conditioning units, each separately controllable. The step of adjusting the power supplied to the air conditioning system may comprise adjusting the power supplied to a subset of the plurality of air conditioning units. For example, one or more of the air conditioning units may be selectively turned off (or its power reduced) while operation of the other air conditioning unit(s) may remain unchanged. In an embodiment where the ancillary load consuming system is a lighting system, the lighting system may comprise a plurality of lights or groups of lights, each separately controllable. The step of adjusting the power supplied to the lighting system may comprise adjusting the power supplied to a subset of the plurality of lights or groups of lights.

In an embodiment of the first or second aspects, the control system is further configured to assign a rank to each ancillary load consuming system based upon a status of the ancillary load consuming system. The status may include one or more of: information related to whether the ancillary load consuming system is presently operating at or near its set point, information related to a deviation of the ancillary load consuming system from its set point, information related to the magnitude and/or speed of the increase or decrease in the non-discretional load, and information related to whether there is an upcoming scheduled or predicted change in the non-discretional load. The predicted change in the non-discretional load requirement may be predicted by any suitable means, including using a machine learning model.

In an alternative embodiment of the first or second aspects, the control system is further configured to assign a rank to each ancillary load consuming system in the plurality of load consuming systems based upon an effect time parameter associated with each load consuming system. The effect time parameter is defined as the time required to observe a substantial effect that is the result of a change in power supplied to a particular ancillary load consuming system. Preferably, the control system assigns a rank to each load consuming system in order from highest associated effect time parameter to lowest associated effect time parameter. An ancillary load consuming system with the highest associated effect time parameter corresponds to a system in which there is a greatest relative time interval between the change in power supplied to that system and a substantial observable effect resulting from that change in power. The effect time parameter therefore signifies a lag time for a particular system. In regard to this aspect, the skilled reader will appreciate that an ancillary load consuming system with the highest assigned rank generally corresponds to a system with the greatest spare power capacity. In other words, the highest ranked ancillary system is the system which can cope with the greatest power supply variation for the longest period of time.

The effect time parameter is a function of the change in power supplied to a particular ancillary load consuming system, and may be predetermined for each ancillary load consuming system by the control system. The effect time parameter for a particular ancillary load consuming system may also be considered as a measure of the tolerance of that particular load consuming system to a change in power supplied to that particular load consuming system. The effect time parameter for each ancillary load consuming system may be determined by the control system continuously at discrete time intervals and/or when a change in state occurs, such as a change in the non-discretional load requirement.

In an embodiment where the ancillary load consuming system is an air conditioning system, the effect time parameter corresponds to the time required to observe a substantial change in temperature within the facility after there has been a change in power supplied to the air conditioning system. In an embodiment where the ancillary load consuming system is a refrigeration system, the effect time parameter corresponds to the time required to observe a substantial change in temperature within the refrigeration system after there has been a change in power supplied to the refrigeration system. In an embodiment where the ancillary load consuming system is a lighting system, the effect time parameter corresponds to the time required to observe a substantial change in lighting conditions after there has been a change in power supplied to the lighting system. The skilled person will appreciate that a lighting system will have a relatively lower effect time parameter when compared to the respective effect time parameters of an air conditioning system or a refrigeration system, say. A person skilled in the art would further appreciate the particular substantial observable effect that would result from a change in power supplied to any particular ancillary load consuming system.

In a further alternative embodiment of the first or second aspects, the control system is configured to assign a rank to each ancillary load consuming system in the plurality of load consuming systems based upon, in combination, the effect time parameter associated with each load consuming system and a user-defined ranking. In this embodiment for example, the user may select one or more load consuming systems to rank, and the control system may rank a remaining one or more of the load consuming systems based upon the effect time parameter associated with each of the remaining one or more load consuming systems. Advantageously, in this embodiment, the user may selectively rank one or more load consuming systems based upon a particular ranking scheme regardless of the respective associated effect time of the selectively ranked one or more load consuming systems.

In a still further alternative embodiment of the first or second aspects, the control system is configured to assign a rank to each ancillary load consuming system in the plurality of load consuming systems based upon the effect time parameter associated with each load consuming system and a predetermined allowable deviation parameter associated with each load consuming system. The predetermined allowable deviation parameter corresponds to an allowable change in a state condition of a particular ancillary system from a predetermined set point, which change in state is effected by a change in power applied to the particular ancillary system. For example, in an embodiment where the ancillary system is an air conditioning system, the predetermined allowable deviation parameter may correspond to an allowable change in temperature from a predetermined set point temperature. In this embodiment, the deviation parameter may provide an upper bound and a lower bound of the allowable change in state condition from the predetermined set point. The upper and lower bounds may have the same value, or may be different. For example, in an embodiment where the ancillary system is an air conditioning system, the predetermined deviation parameter may provide an upper bound that corresponds to a change in temperature of +5° C., and a lower bound that corresponds to a change in temperature of −3° C. Advantageously, in this alternative embodiment, the one or more load consuming systems are effectively ranked in order of highest associated effect time parameter and greatest spare power capacity to lowest associated effect time parameter and lowest spare power capacity.

In a still further alternative embodiment of the first or second aspects, the control system is configured to assign a rank to each ancillary load consuming system in the plurality of load consuming systems based a preferred change in state condition for each ancillary load consuming system that results from the change in the non-discretional load requirement. In this embodiment, the one or more load consuming systems are ranked from the most preferred change in state condition to the least preferred change in state condition resulting from the change in the non-discretional load requirement. For example, in an embodiment where the ancillary load consuming is a lighting system, the lighting system may be ranked relatively highly when compared to other ancillary load consuming systems if the non-discretional load requirement decreases. However, if the non-discretional load requirement increases, the lighting system may be ranked relatively low when compared to other ancillary load consuming systems. In this embodiment, if the non-discretional load requirement decreases, the power supplied to the lighting system would correspondingly increase to meet the change in the non-discretional load requirement, thereby resulting in an increase in lighting brightness. If the non-discretional load requirement increases, the power supplied to the lighting system would correspondingly decrease to meet the change in the non-discretional load requirement, thereby resulting in a decrease in lighting brightness. A user may consider that an increase in brightness is preferable to a decrease in brightness, and thus may rank the lighting system relatively highly compared to other load consuming systems when the non-discretional load requirement decreases, and may rank the lighting system relatively low when compared to other load consuming system when the non-discretional load requirement increases. The change in the lighting brightness may be achieved by adjusting the power supplied to one or more lights or groups of lights of the lighting system, for example selected lights or groups of lights may be switched off to reduce the overall power to the lighting system.

In still further alternative embodiments of the first or second aspects, the control system is configured to assign a rank to each ancillary load consuming system in the plurality of load consuming systems based upon one or more of: a capacity of an ancillary load consuming system to influence a total power supplied by the at least one fuel cell; a tolerance to power variation of an ancillary load consuming system; an ability of an ancillary load consuming system to meet the change in the non-discretional load requirement continuously; a deviation of an ancillary load consuming system from a predetermined target set point of the ancillary load consuming system; and a user-defined ranking.

In an embodiment of the first or second aspects, power to meet the non-discretional load requirement is provided by one or more of: a battery, and/or a capacitor, and/or a supercapacitor, and/or a municipal power grid. Advantageously, the method of the invention allows for the use of smaller batteries and/or capacitors and/or supercapacitors than methods of the prior art.

In an embodiment of the first or second aspects, power to meet the non-discretional load requirement is not provided by one or more of: a battery, and/or a capacitor, and/or a supercapacitor, and/or a municipal power grid.

In an embodiment of the first or second aspects, power to the one or more ancillary load consuming systems is not provided by one or more of: a battery, and/or a capacitor, and/or a supercapacitor, and/or a municipal power grid.

In a third aspect of the invention, there is provided a fuel cell power system for a facility, the fuel cell power system including: at least one fuel cell to provide power to a primary system of a facility to meet a non-discretional load requirement of the primary system and provide power to one or more ancillary systems of the facility; and a control system configured to monitor the non-discretional load requirement of the primary system and to control the supply of power to the primary system and to the one or more ancillary load consuming systems; wherein the control system is further configured to: detect a change in the non-discretional load requirement; adjust the power supplied to the one or more ancillary load consuming systems from a nominal load to meet the change in the non-discretional load requirement; and provide power to the primary system to meet the changed non-discretional load requirement.

In a fourth aspect of the invention, there is provided a fuel cell power system for a data centre facility, the fuel cell power system including: at least one fuel cell to provide power to a server rack of a data centre facility to meet a non-discretional load requirement of the server rack and to provide power to one or more ancillary systems of the data centre facility; and a control system configured to monitor the non-discretional load requirement of the server rack and to control the supply of power to the server rack and to the one or more ancillary load consuming systems; wherein the control system is further configured to: detect a change in the non-discretional load requirement; adjust the power supplied to the one or more ancillary load consuming systems from a nominal load to meet the change in the non-discretional load requirement; and provide power to the server rack to meet the changed non-discretional load requirement.

In an embodiment of the third or fourth aspects, the at least one fuel cell is a solid oxide fuel cell.

In an embodiment of the third or fourth aspects, the method further includes subsequently altering the power output of the at least one fuel cell to provide power to meet the non-discretional load and the nominal load.

In an embodiment of the third or fourth aspects, the control system is further configured to: select one or more ancillary load consuming systems from a plurality of ancillary load consuming systems, each ancillary load consuming system having a corresponding nominal load set point and corresponding operating load range that includes the nominal load set point; adjust the power supplied to each of the selected ancillary load consuming systems from the corresponding nominal load set point to another load value within the corresponding operating load range, and divert power from, or provide power to, the one or more ancillary load consuming services to meet the load value.

In an embodiment of the third or fourth aspects, each ancillary load consuming system in the plurality of ancillary load consuming systems may comprise one or more subsystems, subcomponents, or subunits. In this embodiment, the step of adjusting the power supplied to the one or more ancillary load consuming systems may further comprise adjusting the power supplied to one or more subsystems, subcomponents, or subunits of a particular ancillary load consuming system in the plurality of ancillary load consuming systems. For example, in an embodiment where the ancillary load consuming system is an air conditioning system, the air conditioning system may comprise a plurality of air conditioning units, each separately controllable. The step of adjusting the power supplied to the air conditioning system may comprise adjusting the power supplied to a subset of the plurality of air conditioning units. For example, one or more of the air conditioning units may be selectively turned off (or its power reduced) while operation of the other air conditioning unit(s) may remain unchanged. In an embodiment where the ancillary load consuming system is a lighting system, the lighting system may comprise a plurality of lights or groups of lights, each separately controllable. The step of adjusting the power supplied to the lighting system may comprise adjusting the power supplied to a subset of the plurality of lights or groups of lights.

In one form of the above-mentioned embodiment, the control system is further configured to alter the power output of the fuel cell to provide power to the one or more ancillary load consuming systems sufficient to meet the nominal load.

In one form of the above-mentioned embodiment, the control system is further configured to assign a rank to each ancillary load consuming system in the plurality of load consuming systems and the control system is configured to select one or more ancillary load consuming systems based on the assigned rank.

In one form of the above-mentioned embodiment, the control system is further configured to assign a rank to each ancillary load consuming system based upon a status of the ancillary load consuming system. The status may include one or more of: information related to whether the ancillary load consuming system is presently operating at or near its set point, information related to a deviation of the ancillary load consuming system from its set point, information related to the magnitude and/or speed of the increase or decrease in the non-discretional load, and information related to whether there is an upcoming scheduled or predicted change in the non-discretional load. The predicted change in the non-discretional load requirement may be predicted by any suitable means, including using a machine learning model.

In an alternative form of the above-mentioned embodiment, the control system is further configured to assign a rank to each ancillary load consuming system in the plurality of load consuming systems based upon an effect time parameter associated with each load consuming system. Preferably, the control system assigns a rank to each load consuming system in order from highest associated effect time parameter to lowest associated effect time parameter.

In alternative embodiments of the third or fourth aspects, the control system may be configured to assign a rank to each ancillary load consuming system in any manner described above in relation to the first and second aspects.

In a fifth aspect of the invention, there is provided a facility including the fuel cell power system described in relation to the third aspect of the invention.

In a sixth aspect of the invention, there is provided a data centre facility including the fuel cell power system described in relation to the fourth aspect of the invention, the data centre facility including at least: a server rack including one or more servers and having the non-discretional load requirement; and one or more ancillary load consuming systems having the nominal load.

In an embodiment of the sixth aspect of the invention, non-discretional load of the server rack includes at least the load required by the computational power of the servers and internal cooling of the servers and/or server rack.

In an embodiment of the fifth or sixth aspects, the at least one fuel cell is a solid oxide fuel cell.

In an embodiment of the fifth or sixth aspects of the invention, the ancillary load consuming systems are one or more systems selected from the group consisting of: lighting, ventilation, and air conditioning, heating and/or cooling, electric hot water storage, refrigeration, or battery operated devices which are connected as an ancillary load consuming system but which ancillary loads may be supplemented by batteries.

In an embodiment of the fifth or sixth aspects, power to meet the non-discretional load requirement is provided by one or more of: a battery, and/or a capacitor, and/or a supercapacitor, and/or a municipal power grid. Advantageously, the method of the invention allows for the use of smaller batteries and/or capacitors and/or supercapacitors than methods of the prior art.

In an embodiment of the fifth or sixth aspects of the invention, power to meet the non-discretional load requirement is not provided by one or more of: a battery, and/or a capacitor, and/or a municipal power grid.

In an embodiment of the fifth or sixth aspects of the invention, power to the one or more ancillary load consuming systems is not provided by one or more of: a battery, and/or a capacitor, and/or a municipal power grid.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

The present invention relates to methods of managing the power requirements of a facility powered by fuel cells, a fuel cell power system for a facility, and a facility including such a fuel cell power system. The facility includes both primary systems as well as ancillary systems that are powered by a fuel cell. The fuel cell may be in the form of discrete fuel cells, a fuel cell stack, a fuel cell generator, or multiple fuel cells and/or fuel cell stacks and/or fuel cell generators.

The nature of the primary systems is dependent on the type of facility. Notwithstanding this, the term "primary systems" is generally intended to refer to those services that have an electrical load that must be met (e.g. systems that have a non-discretional electrical load) that are critical for the facility to function. The primary systems may also be referred to as critical systems. Examples of facilities and corresponding primary systems may include: a communication facility including a communication system, a data centre facility including at least a server rack having one or more servers; a hospital having critical life support systems; or any off-grid applications (such as an off-grid house or farm) that have a non-discretional load requirement. The skilled person will appreciate that the invention described herein can be applied to a range of different facilities and primary systems.

The term "ancillary load consuming system" is intended to refer to those systems that are not critical or less critical to the operation of the facility or to those systems where short term delays or shortfalls in meeting a demand are acceptable. That is, an ancillary load consuming system is one which supports the operation of the facility but is not critical to the functioning of the facility, or can operate acceptably with a short term delay in power. The ancillary load consuming services may also be referred to as secondary systems or non-critical systems. The skilled person will appreciate that the term "ancillary load consuming system" covers a broad range of systems, and can include at least: heating and/or cooling systems, air conditioning systems, ventilation systems, lighting systems, electric hot water storage systems, refrigeration systems etc.

The term "nominal load" is intended to refer to the load drawn by one or more of the ancillary load consuming systems. The nominal load may be a baseline load, for example, where an ancillary system operates with a constant load requirement. Alternatively, the nominal load may be a variable or fluctuating load, such as where the ancillary system operates with a load requirement that changes over time, such as in response to a measured parameter. By way of example, a lighting system typically operates with a constant output and thus with a constant load; whereas power drawn by an air conditioning system can vary depending on the difference between an air set point temperature and the ambient air temperature (i.e. more power is drawn by the air conditioning unit when the air temperature is significantly greater than the set point temperature to rapidly cool the air compared with when the air temperature is near to the set point temperature with less cooling required). Further to the above, the nominal load may be an average load required by the one or more ancillary systems, such as an average hourly load.

The present invention stems from the realisation that in some instances, the response time of the flow control of fuel/steam to a fuel cell (which may be in the form of a fuel cell stack or fuel cell generator) is insufficient to address transient, sudden, or unexpected changes in the non-discretional electrical load. As discussed previously, failure to meet this change in load can damage the fuel cell and/or result in the collapse of a power supply system or force operation of the fuel cell at lower nominal fuel utilisation and therefore lower efficiency.

Typically fuel cells are controlled by a power set point which could be steady state or load following. In load following situations, the increase or decrease in the non-discretional load is either known or is predictable and is thus not unexpected or sudden as is the case for a transient change in load. In such cases, either the fuel cell is operated at a utilisation that allows for energy generation to be ramped up or down within a narrow band to meet expected changes in non-discretional load, and/or the supply of fuel to the fuel cell is ramped up or decreased accordingly in advance of an expected change in non-discretional load. In both cases, the change in energy generation of the fuel cell is in anticipation of an expected change in load, rather than being reactionary. Notwithstanding this, in some cases, it is not always possible to alter the energy generation from the fuel cell in response to an anticipated or predictable change at a sufficient rate to meet that change. For example, an anticipated step change in the load may also require load balancing according to the present invention.

Given the above, where there is a transient, sudden, or unanticipated increase in non-discretional electrical load, a fuel cell or fuel cell stack is generally unable to ramp up generation of electricity in sufficient time to meet that increased demand.

In contrast with the prior art approaches, and particularly the approach adopted in McKnight et al. (discussed in the background section), the present inventors propose a control system which specifies a primary system having a non-discretional load, and changes in the non-discretional load can be met by altering the load required by one or more ancillary load consuming systems. This approach smooths the power demand requested of the fuel cell for the primary system from the fuel cell or fuel cell stack. In this way, the one or more ancillary load consuming systems act as an adjustable discretional load that can be altered to ensure that the non-discretional load of the primary system is met, such as in response to a transient, sudden, or unexpected change in the non-discretional load. An advantage of this arrangement is that the operation of primary system is unaffected by these transient, unexpected, or sudden changes in the non-discretional load, e.g. the performance of the primary system is not reduced or compromised. Another advantage is that power generation from the fuel cell is more efficient, a drop in efficiency occurs if the power output from the fuel cell is constantly adjusted.

In various forms, the control system alters the one or more ancillary load consuming systems by diverting power to or from the one or more ancillary load consuming systems as required. In one form, this results in an under/over supply of power to the ancillary load. In another form, the control system may adjust a set point value for that ancillary load consuming system, and then provide an increase/decrease in power to meet the new set point value. In one example, in response to a transient increase in the non-discretional load, the control system may divert energy from an air conditioning system to meet the transient increased in the non-discretional load. This results in power to the air conditioning system being insufficient to meet the load required by the air conditioning system. In another example, in response to a transient increase in the non-discretional load, the control system may reduce the cooling requirements of an air conditioning system, such as by increasing its set point temperature. This reduces the electrical load required by the air conditioning system, and instead makes this energy available within the system to meet the non-discretional load requirements of the primary system. Conversely, in response to a transient decrease in the non-discretional load, the control system may increase the cooling requirements of the air conditioning system, such as by lowering the set point temperature. This increases the electrical load required by the air condition system, and therefore consumes the excess energy made available by the decrease in the non-discretional load. In both of these cases, the fuel cell or fuel cell stack continues to operate at the same power output. It will be appreciated the power available from an ancillary system to smooth a change in load as seen by the fuel cell, and the time taken to divert that power available from an ancillary system may vary between ancillary systems. In this regard, the controller is configured to select the appropriate ancillary system to ensure that the response to the transient change in load is smoothed at an appropriate rate. In some instances, power may need to be immediately cut to one or more ancillary systems to ensure adequate power is available to meet the non-discretionary load within the required time frame.

Air conditioning, refrigeration, and heating/cooling systems are particularly useful ancillary load consuming systems from which to divert energy or provide additional energy due to a transient change in the non-discretional load. This is because the lag time (or response time) for a change in temperature due to altering the power supplied to one of these systems is far greater than the required response time for a transient change in the non-discretional load and the response time to increase or decrease energy output from the fuel cell or fuel cell stack. Thus, energy can be diverted from, for example the air conditioning system to address a transient increase in the non-discretional load without substantial immediate impact on the air temperature. If it is important for the air temperature to be maintained, then energy generated by the fuel cell or fuel cell stack can be ramped up to ensure the air conditioning system can maintain the air temperature before there has been a substantial change in air temperature. This is described below in more detail.

In an embodiment, there is provided a data centre having a server rack including one or more servers with a non-discretional load requirement. The data centre experiences an unexpected increase in processing power due to heavier than usual online traffic. As a result, there is a transient increase in the non-discretional load requirement. To maintain operation of the server rack, additional power is required to meet the sudden increase in load. The response time of a fuel cell is typically too slow to provide the required increase in power. The system includes a controller that is configured to detect a change in the non-discretional load requirement, and divert power from an ancillary system to meet the non-discretional load requirement. The controller may directly divert load from an ancillary system, in which case the load requirements of that ancillary system are not met resulting in that ancillary system being under loaded; the controller may deactivate an ancillary system; or the controller may adjust a nominal load or a baseline load set point of one or more ancillary services to decrease the load requirement of that ancillary service and make additional power available to meet the increased non-discretional load requirement within the necessary response time. In one illustrative example, the ancillary load consuming system is an air conditioning system, the controller increases the air temperature set point of the air conditioning system thus decreasing the cooling requirements. This decreases the load required to run the air conditioning system and frees up energy to meet the increased non-discretional load. Notably, no increase in energy generation from the fuel cell or fuel cell stack is required to accommodate the increase in the non-discretional load. If the non-discretional load is maintained for an extended period of time, then the air temperature will slowly increase to the new set point value. However, as discussed previously, this increase in temperature of the air occurs over a much slower response time. If required, the generation of energy from the fuel cell or fuel cell stack can be increased to provide additional energy into the system so that the nominal load requirement of the air conditioning system can be met and/or the controller can revert the air conditioning system to its original temperature set point. The response time for increasing energy production from the fuel cell or fuel cell stack is of the order of a minutes, and therefore ramping up power production of the fuel cell to meet a transient increase in load is not feasible. However, given this time frame, ramping up power production from the fuel cell can provide additional energy to the air conditioning system before the air temperature has deviated from the original set point value.

Conversely, if there is a transient decrease in the non-discretional load, excess energy can be diverted directly to the one or more ancillary load consuming systems which may result in that system being overloaded, activating an inactive ancillary load consuming service, or altering a set point of an ancillary service to increase the load required by that ancillary service. Energy generation from the fuel cell or fuel cell stack can then be decreased if required. In the case of an air conditioning system, the temperature set point may be lowered resulting in an increased load requirement for the air conditioning system. The effect of this is that the air is cooled to a temperature lower than the original set point. The skilled person will appreciate that the selection of any particular ancillary system and the manner in which the additional power is supplied to that ancillary system is dependent on the nature of the transient decrease in load. If necessary, for example if the decrease in the non-discretional load occurs for an extended period of time, generation of energy from the fuel cell or fuel cell stack can be reduced.

It will be appreciated that there are a range of different ancillary load consuming systems each with different response times and different load requirements. Given this, in embodiments, the controller is further configured to: rank the ancillary load consuming systems, and upon detecting a change in the non-discretional load requirement, select one or more ancillary load consuming systems, and adjust an operating set point of those one or more ancillary services according to the rank. By way of example, the ancillary load consuming systems include at least: lighting system, a ventilation system, an air conditioning system, and heating systems such as hot water systems. The controller may select to alter the set point of one or more of those ancillary load consuming systems based on the status of each of the one or more ancillary load consuming system, such as whether that system is presently operating at or near its set point, the deviation of the system from its set point, the magnitude of the increase or decrease in the non-discretional load, and/or whether there is an upcoming scheduled or predicted change in the non-discretional load. If, for example, there is a small change in the non-discretional load requirement, then this may best be handled by altering the load requirement of a system that can easily accommodate small changes in load. Alternatively, if there is a large change in the non-discretional load requirement, then this is may be best handled by a system in which a small change in the set point value provides a large change in load such as an air conditioning system.

While the invention is applicable to a range of different facilities having different primary systems and ancillary load consuming systems, the invention will now be described in relation to a preferred embodiment in which the facility is a data centre facility including a number of server racks.

Figure 1:
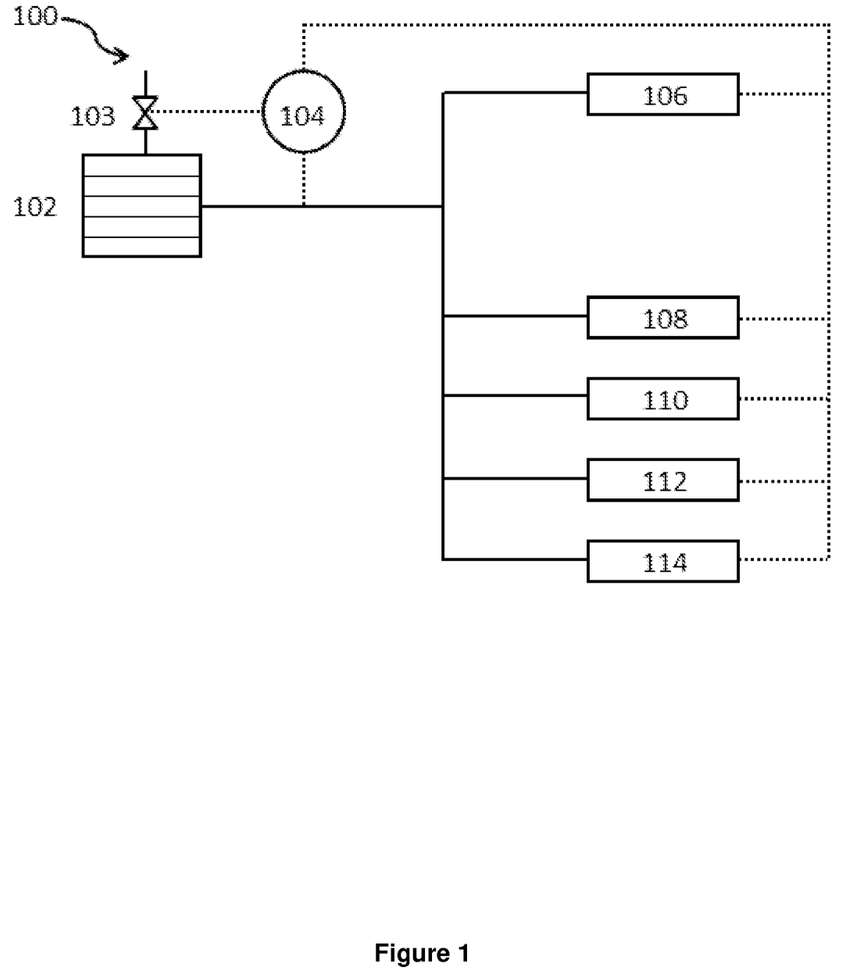
FIG. 1 is a schematic of a fuel cell power management system for a data server facility according to one embodiment of the invention.

FIG. 1 is a schematic of a fuel cell power management system 100 for a data server facility. The system 100 includes a fuel cell stack 102 with gas supply valve 103 that provides power to the system, a controller 104 configured to manage power supply, data server rack 106 having a non-discretional load requirement, and a plurality of ancillary systems including a lighting system 108, an air conditioning system 110, an electric hot water storage system 112, and battery operated laptop devices 114 connected to the system. The controller 104 is configured to monitor the non-discretional load of at least the data server rack 106 and to control the amount of power supplied to the data server rack 106, the lighting system 108, the air conditioning system 110, the electric hot water storage system 112, and the battery operated laptop devices 114. In the event of a transient increase in the non-discretional load required by the data server rack 106, the controller 104 is configured to decrease the loads of one or more of the lighting system 108, the air conditioning system 110, the electric hot water storage system 112, and the battery operated laptop devices 114 in order to meet the transient increase in non-discretional load of the data server rack 106. In the event of a transient decrease in the non-discretional load required by the data server rack 106, the controller 104 is configured to increase the loads of one or more of the lighting system 108, the air conditioning system 110, the electric hot water storage system 112, and the battery operated laptop devices 114 in order to ensure the power generated by the fuel cell is utilised. If the transient change in load is sustained, the controller 104 may adjust fuel supply valve 103 and/or a steam or air supply valve (not shown) to increase or decrease the power generated by the fuel cell stack 102 as appropriate.

Figure 2:
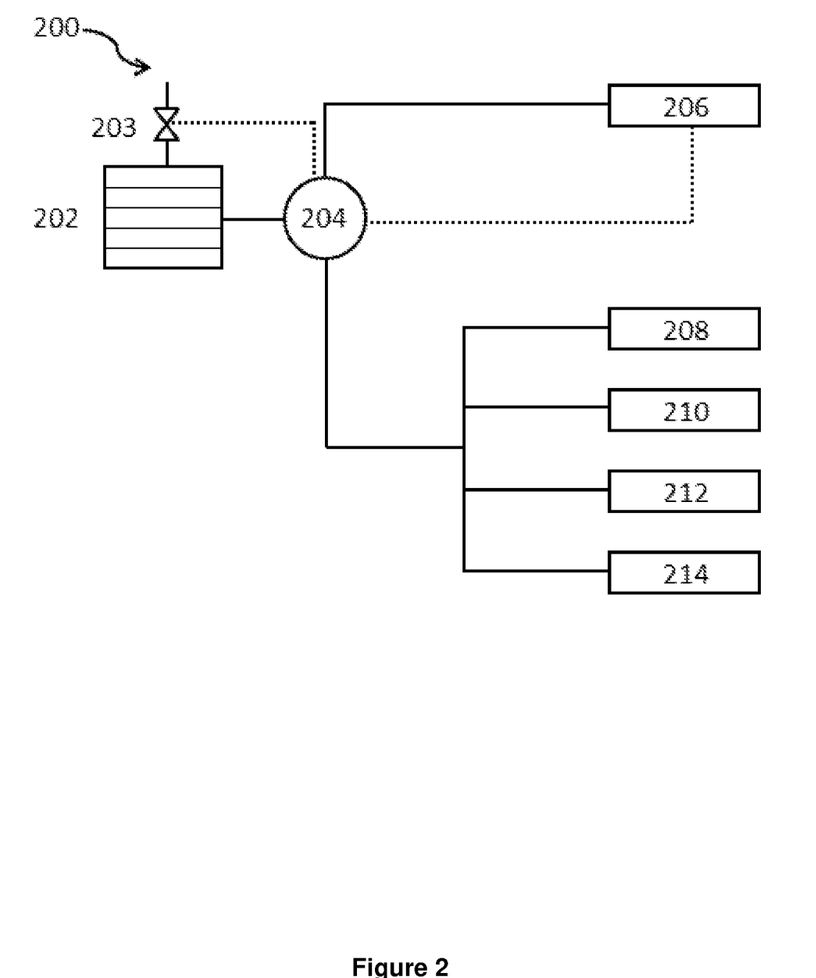
FIG. 2 is a schematic of a fuel cell power management system for a data server facility according to one embodiment of the invention.

While FIG. 1 illustrates the controller altering the loads of the ancillary systems, it will be appreciated that the controller may instead directly control the supply of power to the data server. FIG. 2 provides an illustration of another embodiment of a fuel cell power management system 200. As with the system 10 of FIG. 1, the system 200 of FIG. 2 includes: a fuel cell stack 202 with a gas supply valve 203, a controller 204, data server racks 206 having a non-discretional load requirement, and a plurality of ancillary systems including a lighting system 208, an air conditioning system 210, an electric hot water storage system 212, and battery operated laptop devices 214 connected to the system. In this system, the controller 204 is configured to monitor at least the power output of the fuel cell stack 202 and the non-discretional load requirement of the data server rack 206, and to control the supply of power to the data server rack 206 to ensure that the load required by the data server rack 206 is met. On this basis, the controller may calculate a discretional load (e.g. the power drawn by the ancillary systems) being the difference between the total power supplied by the fuel cell stack 202 and the non-discretional power. The controller 204 is configured to treat this discretional load as a buffer that can be drawn upon in the event of a transient increase in the non-discretional load requirements of the data server rack 206. In the event of a transient increase in non-discretional load, the controller 204 is configured to divert power from this buffer to ensure that the non-discretional load requirements of the data server rack 206 are met. Alternatively, in the event of a transient decrease in load, the controller 206 diverts additional power to one or more of the ancillary systems 208, 210, 212, 214. If the transient change in load is sustained, the controller 204 may adjust fuel supply valve 203 and/or a steam or air supply valve (not shown) to increase or decrease the power generated by the fuel cell stack 202 as appropriate.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of managing power requirements of a facility powered by fuel cells, the facility including:
    a primary system having a non-discretional load requirement, the non-discretional load requirement including electrical loads required for the primary system to function;
    one or more ancillary load consuming systems having a nominal load, the one or more ancillary load consuming systems being independent of the primary system, the nominal load including electrical loads associated with a function of the one or more ancillary load consuming systems;
    at least one fuel cell electrically connected to the primary system and the one or more ancillary load consuming systems, the at least one fuel cell configured to provide power to the primary system to meet the non-discretional load requirement and provide power to the one or more ancillary systems; and
    a control system configured to monitor the non-discretional load requirement and to control the supply of power to the primary system and to the one or more ancillary load consuming systems;
    the method comprising:
    while the at least one fuel cell is electrically connected to the primary system and the one or more ancillary load consuming systems:
    in response to detecting an increase in the non-discretional load requirement;
    operating, by the control system, the at least one fuel cell at a substantially constant power output by:
        decreasing, by the control system, the power supplied from the at least one fuel cell to the one or more ancillary load consuming systems from the nominal load to meet the transient increase in the non-discretional load requirement; and
        increasing, by the control system, the power supplied from the at least one fuel cell to the primary system to meet the transient increase in the non-discretional load requirement; and
    in response to detecting a decrease in the non-discretional load requirement;
    operating, by the control system, the at least one fuel cell at a substantially constant power output by:
        increasing, by the control system, the power supplied from the at least one fuel cell to the one or more ancillary load consuming systems from the nominal load to meet the transient decrease in the non-discretional load requirement; and
        decreasing, by the control system, the power supplied from the at least one fuel cell to the primary system to meet the transient decrease in the non-discretional load requirement.

2. The method of claim 1, wherein the facility is a data centre and the primary system is a server rack including one or more servers.

3. The method of claim 2, wherein the non-discretional load of the server rack includes at least the load required by the computational power of the servers and internal cooling of the servers and/or server rack.

4. The method of claim 1, wherein, if the increase or decrease in the non-discretional load requirement is sustained, the method further includes subsequently altering the power output of the at least one fuel cell to meet the increase or decrease in the non-discretional load requirement while providing power to the one or more ancillary load consuming systems at the nominal load.

5. The method of claim 1, the facility including a plurality of ancillary load consuming systems, each ancillary load consuming system having a corresponding nominal load set point and corresponding operating load range that includes the nominal load set point;
    wherein the step of adjusting the power supplied from the at least one fuel cell to the one or more of the plurality of ancillary load consuming systems includes:
        selecting one or more ancillary load consuming systems;
        adjusting the power supplied to each of the selected ancillary load consuming systems from the corresponding nominal set point to another load value within the corresponding operating load range; and
        providing power to the one or more ancillary load consuming systems meet the updated nominal load.

6. The method of claim 5, the control system configured to assign a rank to each ancillary load consuming system in the plurality of load consuming systems, wherein the step of selecting one or more ancillary load consuming systems includes selecting the one or more ancillary load consuming systems based on the assigned rank.

7. The method of claim 6, wherein the control system is configured to assign a rank to each ancillary load consuming system based upon an effect time parameter associated with each load consuming system.

8. The method of claim 7, wherein the control system is configured to assign a rank to each ancillary load consuming system in order from highest associated effect time parameter to lowest associated effect time parameter.

9. The method of claim 1, wherein the ancillary load consuming systems are one or more systems selected from the group consisting of: lighting, ventilation, air conditioning, heating and/or cooling, electric hot water storage, refrigeration, or battery operated devices connected as ancillary load consuming services.

10. The method of claim 1, wherein power to meet the non-discretional load requirement is not provided by one or more of: a battery, and/or a capacitor, and/or a supercapacitor, and/or a municipal power grid.

11. The method of claim 1, wherein power to the one or more ancillary load consuming systems is not provided by one or more of: a battery, a capacitor, a supercapacitor, a municipal power grid.

12. The method of claim 1, wherein the at least one fuel cell is a solid oxide fuel cell.

13. A fuel cell power system for a facility, the fuel cell power system comprising:
    at least one fuel cell connected to and configured to provide power to:
        a primary system of a facility to meet a non-discretional load requirement of the primary system, the non-discretional load requirement including electrical loads required for the primary system to function; and
        one or more ancillary load consuming systems of the facility having a nominal load, the one or more ancillary load consuming systems being independent of the primary system, the nominal load including electrical loads associated with a function of the one or more ancillary load consuming systems; and a control system configured to monitor the non-discretional load requirement of the primary system and to control the supply of power to the primary system and to the one or more ancillary load consuming systems;

wherein the control system is further configured to, while the at least one fuel cell is electrically connected to the primary system and the one or more ancillary load consuming systems:

in response to detecting a transient increase in the non-discretional load requirement:

operate the at least one fuel cell at a substantially constant power output by:

decreasing the power supplied from the at least one fuel cell to the one or more ancillary load consuming systems from the nominal load to meet the transient increase in the non-discretional load requirement; and increasing the power supplied from the at least one fuel cell to the primary system to meet the transient increase in the non-discretional load requirement; and in response to detecting a transient decrease in the non-discretional load requirement:

operate the at least one fuel cell at a substantially constant power output by:

increasing the power supplied from the at least one fuel cell to the one or more ancillary load consuming systems from the nominal load to meet the transient decrease in the non-discretional load requirement; and decreasing the power supplied from the at least one fuel cell to the primary system to meet the transient decrease in the non-discretional load requirement.

14. The fuel cell power system of claim 13, wherein the facility is a data centre and the primary system is a server rack.

15. A data centre facility including the fuel cell power system of claim 14, the data centre facility including at least:

a server rack including one or more servers and having the non-discretional load requirement; and one or more ancillary load consuming systems having the nominal load set point.

16. The data centre facility of claim 15, wherein the non-discretional load of the server rack includes at least the load required by the computational power of the servers and internal cooling of the servers and/or server rack.

17. The fuel cell power system of claim 13, wherein the control system is further configured to:

select one or more ancillary load consuming systems from a plurality of ancillary load consuming systems, each ancillary load consuming system having a corresponding nominal load set point and corresponding operating load range that includes the nominal load set point;

adjust the power supplied from the at least one fuel cell to each of the selected ancillary load consuming systems from the corresponding nominal load set point to another load value within the corresponding operating load range; and divert power from, or provide power to, the one or more ancillary load consuming services to meet the load value.

18. The fuel cell power system of claim 17, wherein, if the increase or decrease in the non-discretional load requirement is sustained, the control system is further configured to alter the power output of the at least one fuel cell to meet the increase or decrease in the non-discretional load requirement while providing power to the one or more ancillary load consuming systems at the nominal load set point.

19. The fuel cell power system of claim 17, the control system further configured to assign a rank to each ancillary load consuming system in the plurality of load consuming systems, wherein the control system is configured to select one or more ancillary load consuming systems based on the assigned rank.

20. A facility including the fuel cell power system of claim 13.

21. The facility of claim 20, wherein the ancillary load consuming systems are one or more systems selected from the group consisting of: lighting, ventilation, air conditioning, heating and/or cooling, electric hot water storage, refrigeration, or battery operated devices connected as ancillary load consuming services.

22. The facility of claim 20, wherein power to meet the non-discretional load requirement is not provided by one or more of: a battery, and/or a capacitor, and/or a municipal power grid.

23. The facility of claim 20, wherein power to the one or more ancillary load consuming systems is not provided by one or more of: a battery, and/or a capacitor, and/or a municipal power grid.

24. The fuel cell power system of 13, wherein the at least one fuel cell is a solid oxide fuel cell.

* * * * *